(12) United States Patent
Bower, III et al.

(10) Patent No.: US 10,298,388 B2
(45) Date of Patent: May 21, 2019

(54) WORKLOAD ENCRYPTION KEY

(71) Applicant: Lenovo Enterprise Solutions (Singapore) PTE. LTD., New Tech Park (SG)

(72) Inventors: Fred Allison Bower, III, Durham, NC (US); Ajay Dholakia, Morrisville, NC (US); Gregory B. Pruett, Raleigh, NC (US); Christopher Landon Wood, Chapel Hill, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 94 days.

(21) Appl. No.: 15/178,847

(22) Filed: Jun. 10, 2016

(65) Prior Publication Data
US 2017/0359170 A1 Dec. 14, 2017

(51) Int. Cl.
*H04L 9/08* (2006.01)
*H04L 9/14* (2006.01)
*H04L 9/30* (2006.01)

(52) U.S. Cl.
CPC .......... *H04L 9/0825* (2013.01); *H04L 9/0822* (2013.01); *H04L 9/0894* (2013.01); *H04L 9/14* (2013.01); *H04L 9/30* (2013.01)

(58) Field of Classification Search
CPC ....... H04L 9/0822; H04L 9/30; H04L 9/0894; H04L 9/14; H04L 9/0936
See application file for complete search history.

(56) References Cited

U.S. PATENT DOCUMENTS

| | | | | |
|---|---|---|---|---|
| 6,742,114 | B1 * | 5/2004 | Carter | H04L 63/08 709/201 |
| 9,800,517 | B1 * | 10/2017 | Anderson | H04L 47/70 |
| 2010/0161956 | A1 * | 6/2010 | Rasheed | H04L 9/0825 713/150 |
| 2013/0254841 | A1 * | 9/2013 | Venkatesan | G06F 21/85 726/3 |
| 2015/0058629 | A1 * | 2/2015 | Yarvis | H04L 63/061 713/171 |
| 2015/0229619 | A1 * | 8/2015 | Costa | H04L 63/0823 713/171 |
| 2016/0380761 | A1 * | 12/2016 | Dow | H04L 63/0428 380/28 |

* cited by examiner

*Primary Examiner* — Robert B Leung
(74) *Attorney, Agent, or Firm* — Jason Friday

(57) ABSTRACT

A workload server computing device receives a workload encryption key from a workload client computing device over a network. The workload encryption key is encrypted with a public encryption key of the workload server computing device. The workload server computing device decrypts the workload encryption key using a private encryption key of the workload server computing device corresponding to the public encryption key. The workload server computing device receives a workload from the workload client computing device over the network. The workload is encrypted with the workload encryption key. The workload server computing device decrypts the workload using the workload encryption key, and executes the decrypted workload for the workload client computing device.

15 Claims, 3 Drawing Sheets

WORKLOAD ENCRYPTION KEY

BACKGROUND

Traditionally, organizations such as corporations hosted computing devices like servers at locations under the control of the organizations. For example, a company may have purchased or leased a number of servers, and located them in a server room at the same location as the company's other assets, including its human resources, or at an offsite location under the control of the company. However, computing needs can be variable, which means that many times organizations have had to purchase or lease more servers than what they typically needed, to accommodate peak utilization.

More recently, cloud computing topologies such as infrastructure as a service (IaaS) and platform as a service (PaaS) have become available. An organization may be able to rent or lease a portion of a computing device like a server, or the complete computing device, for a period of time ranging from days to weeks or even months or longer. The computing device remains physically located at the facilities of a service provider, and a company or other customer of the provider accesses the device over the Internet. This means that the company can more closely size the computing resources it leases with the company's current computing needs.

SUMMARY

An example method includes receiving, by a workload server computing device, a workload encryption key from a workload client computing device over a network. The workload encryption key is encrypted with a public encryption key of the workload server computing device. The method includes decrypting, by the workload server computing device, the workload encryption key using a private encryption key of the workload server computing device corresponding to the public encryption key. The method includes receiving, by the workload server computing device, a workload from the workload client computing device over the network. The workload is encrypted with the workload encryption key. The method includes decrypting, by the workload server computing device, the workload using the workload encryption key. The method includes executing, by the workload server computing device, the workload for the workload client computing device.

An example non-transitory computer-readable data storage stores storing computer-executable code that a workload client computing device executes to perform a method. The method includes receiving, from a workload server management computing device over a network, public encryption keys corresponding to workload server computing devices that have been assigned to the workload client computing device. The method includes generating a workload, and encrypting the workload with a workload encryption key. The method includes determining a selected workload server computing device, from the workload server computing devices, to execute the workload. The method includes sending the workload encrypted with the workload encryption key to the selected workload server computing device over the network An example workload server management computing device includes network hardware to communicatively connect the workload server management computing device with workload server computing devices and a workload client computing device over a network. Each workload server computing device has a public encryption key. The workload server management computing device includes a processor, and a non-transitory computer-readable data storage medium storing computer-executable code. The processor executes the computer-executable code to receive a request over the network from the workload client computing device for a subset of the workload server computing devices on which the workload client computing device is permitted to send workloads for execution thereat. The processor executes the computer-executable code to, in response to receiving the request, select the subset of the workload server computing devices on which the workload client computing device is permitted to send the workloads for execution thereat. The processor executes the computer-executable code to send to the workload client computing device over the network the public encryption key of each workload server computing device of the subset, within a response to the request. The workload client computing device uses the public encryption key of a selected workload server computing device of the subset to encrypt a workload encryption key for transmission to the selected workload server computing device. The workload client computing device uses the workload encryption key to encrypt a workload for transmission to the selected workload server computing device that is to execute the workload.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
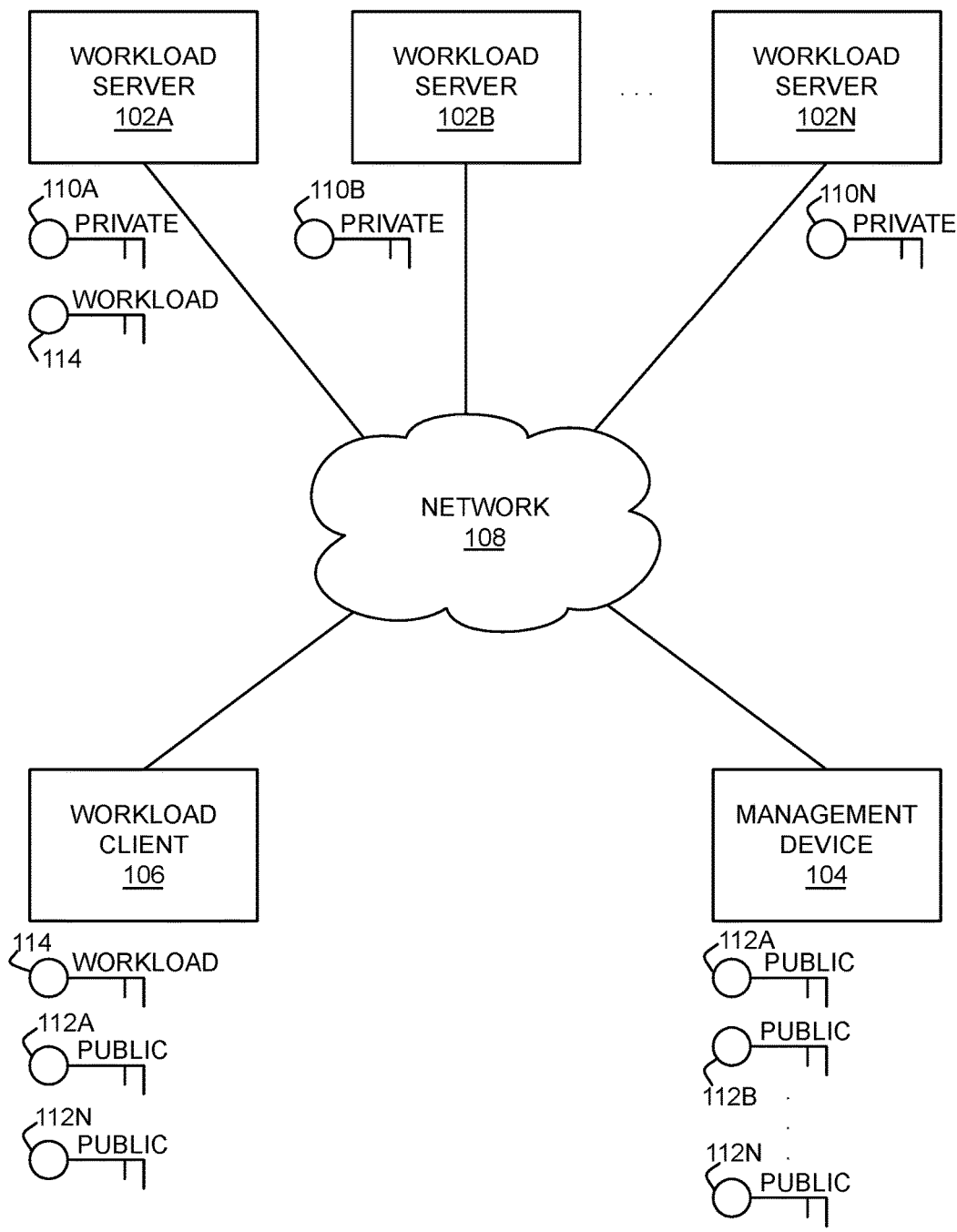
FIG. 1 is a diagram of an example system including workload server computing devices, a management computing device, and a workload client computing device.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, cloud computing topologies such as infrastructure as a service (IaaS) and platform as a service (PaaS) permit organizations like companies to lease or rent computing devices, such as servers, which remain physically located at the facilities of service providers. When a company or other customer leases or rents a server, for instance, the service provider provides the company with access to the server over the Internet, for the company's exclusive use. When the company no longer requires the server, days, weeks, or even months later, the service provider can then provide a different customer exclusive access to the server.

When a client, such as a company, leases or rents a server, the client has to have a level of trust with the service provider, to ensure that a workload the client presents for processing using the service provided by the service provider will not reveal the workload to malicious parties. For example, a malicious party may set up its own server, and attempt to intercept the workload provided by the client over a public network like the Internet. If the malicious party is successful, the client's workload may be corrupted or stolen.

One existing technique to avoid this security issue is for a service provider to employ a gateway to which the client submits its workload. The gateway then relays the workload to a trusted server of the service provider for processing. However, a malicious party may attack the gateway to redirect the workload to an untrusted server maintained by the malicious party, or even attempt to place a server on the service provider's network so that the gateway directs the workload to the malicious party's server.

Due to security concerns like these, many customers of service providers may choose not to use cloud computing for sensitive workloads, such as those that include sensitive or confidential information. Worse, many potential customers may forgo use of cloud computing altogether, and instead maintain their own private data centers made up of their own servers to process workloads. The increased usage of cloud computing is thus predicated on the level of trust customers and potential customers have with the security afforded by service providers.

Techniques disclosed herein overcome existing shortcomings to security in hosted server environments, by providing additional security. A workload server computing device receives a workload encryption key from a workload client computing device over a network. The workload encryption key is encrypted with a public encryption key of the workload server computing device. The workload server computing device decrypts the workload encryption key using a private encryption key that corresponds to the public encryption key.

By providing the workload server computing device the workload encryption key, the workload client computing device effectively binds any future workload that is encrypted with this key to the workload server computing device. Thus, the workload client computing device submits a workload to the workload server computing device that is encrypted with the workload encryption key. The workload server computing device decrypts the workload using the previously provided workload encryption key, and then executes the workload for the workload client computing device.

Therefore, a malicious party, even if it successfully attacks a gateway that is to convey the workload to the workload server computing device to instead convey the workload to an untrusted server, or that is able to place an untrusted server on the service provider's network to receive the workload from the gateway, is unable to access the workload. This is because the untrusted server does not have the workload encryption key. Since the workload server computing device may be the only server that was provided the workload encryption key, the workload encrypted with this key is effectively bound to this server. This means that only this workload server computing device can decrypt the workload, and thus only this server can access any confidential or sensitive information of the workload.

FIG. 1 shows an example system 100. The system 100 includes workload server computing devices, or workload servers, 102A, 102B, . . . , 102N, which are collectively referred to as the server computing devices, or servers, 102. The workload servers 102 can be operated by a service provider that leases or rents the servers 102 to customers, lessees, or tenants, which are referred to as clients. The workload servers 102 physically remain at a location under the control or management of the service provider. When a client leases a workload server 102, the service provider gives the client electronic access to the server 102, but generally does not provide the client with physical access to the server 102. In general, when a client leases a workload server 102, the client receives exclusive access to the server 102 during the lease or rental period. That is, the client generally has exclusive access to the rented workload server 102 in question, as opposed to shared access with other clients of the service provider.

The system 100 includes a management computing device, or management device, 104, which is a remote computing device that a host user, such as the service provider, uses to remotely access the workload servers 102. Similarly, the system 100 includes a workload client computing device, or workload client, 106 that a client of the service provider uses to remotely access one or more of the workload servers 102. The management device 104 and the workload client 106 access the workload servers 102 over a network 108, which may be or include the Internet, intranets, extranets, wide-area networks (WANs), local-area networks (LANs), mobile data networks, wired networks, wireless networks, and so on. Examples of the management device 104 and the workload client 106 include desktop and laptop computers, tablet computing devices, and smartphones.

The workload servers 102 have private encryption keys 110A, 110B, . . . , 110N, respectively, which are collectively referred to as the private encryption keys 110. Each workload server 102 has a corresponding private encryption key 110. The workload servers 102 also have public encryption keys 112A, 112B, . . . , 112N, respectively, which are collectively referred to as the public encryption keys 112, and which the management device 104 stores. The private encryption key 110 and the public encryption key 112 of each workload server 102 make up an asymmetric private-public encryption key pair. The public encryption keys 112 are publicly shareable, whereas the private encryption keys 110 are securely maintained by their respective workload servers 102. Communications encrypted by a public encryption key 112 can be decrypted only with the corresponding private encryption key 110 of the workload server 102 having that private encryption key 110. Furthermore, communications digitally signed by the private encryption key 110 of a workload server 102 can be authenticated using the corresponding public encryption key 112 to confirm that the workload server 102 in fact was the originator of the communications.

The workload client 106 has a workload encryption key 114. The workload encryption key 114 can be a symmetric encryption key. Therefore, data encrypted with the workload encryption key 114 can be decrypted only by the same workload encryption key 114. The workload encryption key 114 may be specific to a particular client of the service provider, a particular workload of the client, and so on. The workload client 106 may generate the workload encryption key 114.

In operation, the workload client 106 can request that the management device 104 assign the workload client 106 one or more workload servers 102 to which the workload client 106 can process workloads for the client 106. A workload can be considered a discrete amount of work that the workload client 106 provides a workload server 102 to process or execute on its behalf. In response, the management device 104 assigns the workload client 106 one or more workload servers 102, and provides the workload client 106 with the public encryption keys 112 of the assigned workload servers 102. In the example of FIG. 1, the management device 104 has assigned the workload client 106 the workload servers 102A and 102N, and has provided the workload client 106 with the public encryption keys 112A and 112N of the servers 102A and 102N. The management device 104 may also notify the workload servers 102A and 102N that the workload client 106 has been assigned to them, so that the servers 102A and 102N can authenticate the workload client 106 when the client 106 submits workloads to them.

The workload client 106 can select one of the assigned workload servers 102A and 102N to execute a given workload. In the example of FIG. 1, the workload client 106 has selected the workload server 102A to execute the workload. The workload client 106 encrypts the workload encryption key 114 using the public encryption key 112A of the workload server 102A, and sends the encrypted workload encryption key 114 to the server 102A. The workload server 102A decrypts the encrypted workload encryption key 114 using its private encryption key 110A that corresponds to the public encryption key 112A.

The workload client 106 can then encrypt the workload itself using the encryption key 114, and sends the encrypted workload to the workload server 102A. The workload server 102A decrypts the encrypted workload using the previously provided encryption key 114. The workload server 102A then can process or execute the workload, and may return execution results back to the workload client 106. The execution results may also be encrypted (and thus decrypted) using the encryption key 114.

Usage of the workload encryption key 114 affords security within the system 100. Just the workload server 102A can decrypt the workload provided by the workload client 106, because the client 106 has shared the workload encryption key 114 with just the server 102A. If a malicious party intercepts the workload as it traverses the network 108 from the workload client 106 to the workload server 102A, the party cannot decrypt and thus cannot access the workload. If the workload server 102A is to receive the encrypted workload from the workload client 106 via a gateway server computing device of the service provider, which receives the workload from the client 106 and conveys the workload to the server 102A, then a malicious party placing its own untrusted server on the service provider's internal network and directing the gateway to convey to this untrusted server the workload will still be unable to access the workload. This is because the untrusted server does not have the workload encryption key 114. The usage of the public encryption key and the private encryption key 110A of the workload server 102A further permits the initial transmission of the workload encryption key 114 from the workload client 106 to the workload server 102A to be secure.

Figure 2:
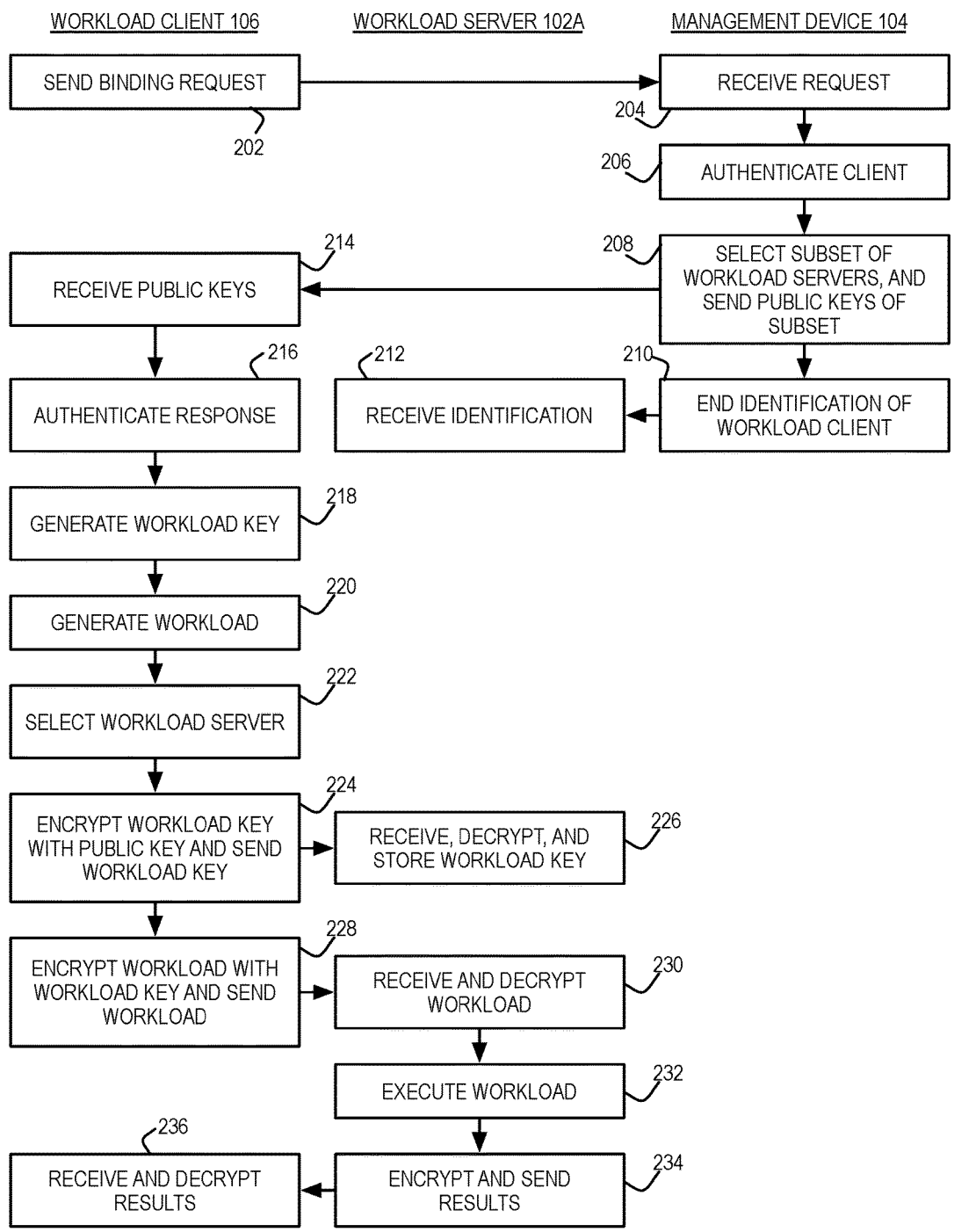
FIG. 2 is a flowchart of an example method for use of a workload encryption key to provide security within the system of FIG. 1.

FIG. 2 shows an example method 200 that illustrates the functionality that has been described in relation to FIG. 1, and which is further described in relation to the example presented in FIG. 1. The parts of the method 200 in the left column are performed by the workload client 106; the parts in the middle column are performed by the workload server 102A; and the parts in the right column are performed by the management device 104. The left, middle, and right parts of the columns of the method 200 may be implemented as computer-executable code stored on a non-transitory computer-readable data storage medium and executed by a processor of the workload client 106, the workload server 102A, and the management device 104, respectively.

The workload client 106 can send a binding request to the management device 104, to bind the client 106 to a subset of the workload servers 102 (202). The workload client 106 may sign the binding request with a private encryption key of the client 106. The management device 104 receives the request (204), and if signed with the private encryption key of the workload client 106, can authenticate the client as the originator of the request (206), against the public encryption key of the client 106.

The management device 104 selects a subset of the workload servers 102 to which to bind the workload client 106, and sends the public encryption keys 112 of the selected workload servers 102 to the client 106 (208). The management device 104 may select the subset of the workload servers 102 based on a quality-of-service (QOS) agreement that the client has signed, based on the number of servers 102 needed for the expected workloads of the workload client 106, or in another manner. The management device 104 may sign the public encryption keys 112 of the selected workload servers 102 with its private encryption key. Per the example of FIG. 1, the selected subset includes the workload servers 102A and 102N, such that the management device 104 sends the public encryption keys 112A and 112N to the workload client 106. The management device also may send the identification of the workload client 106 to each selected workload server 102, including workload server 102A (210). As such, the workload server 102A receives the identification of the workload client 106 (212), which the server 102A can later use to authenticate the client 106 as an authorized workload client on whose behalf the server 102A is to execute received workloads. For example, the identification may be the public encryption key of the client 106.

The workload client 106 receives the public encryption keys 112A and 112N of the workload servers 102A and 102N selected by the management device 104 (214). If the management device 104 signed the public encryption keys 112A and 112N with its private encryption key, then the workload client 106 can further authenticate this response from the device 104 as originating from the management device 104 (216), using the public encryption key of the device 104. The workload client 106 generates the workload encryption key 114 (218). For instance, the workload client 106 can generate the workload encryption key 114 directly, or generate the encryption key 114 indirectly by using a third-party service.

The workload client 106 generates a workload (220). The client 106 may similarly generate the workload itself, directly, or it may generate the workload indirectly, such as by receiving workloads from one or more sub-clients on whose behalf it submits the workload to a workload server 102 for processing. The workload client 106 selects one of the subset of workload servers 102 for which it has received public encryption keys 112 to process the generated workload (222). In the example of FIGS. 1 and 2, the workload client 106 selects the workload server 102A and not the workload server 102N. The workload client 106 may select the workload server 102A in a round-robin fashion, by querying the workload servers 102A and 102N and selecting the server 102 that has the better capabilities to process the generated workload or the server 102 that is not currently processing other workloads, or in another manner.

In the implementation of FIG. 2, the workload client 106 encrypts the workload encryption key 114 with the public encryption key 112A of the selected workload server 102A and sends the encrypted workload key 114 to the workload server 102A (224). The workload server 102A in turn receives the workload encryption key 114, decrypts the key 114 with its private encryption key 110A, and stores the workload key 114 (226). The workload client 106 in this implementation thus sends the workload encryption key 114 just to the selected workload server 102A for the generated workload, and may not send the key 114 until just and immediately prior to sending the workload to the selected server 102A. Therefore, the workload client 106 may generate a workload encryption key 114 on a per-workload basis, and send the workload key 114 for a particular workload as it generates the workload, and send the key 114 just to the selected workload server 102 for the particular workload.

In another implementation, by comparison, the workload client 106 may send the workload encryption key 114 to each workload server 102 to which it has bound or assigned—that is, to each workload server 102 for which the client 106 has received a public encryption key 112 from the management device 104 in part 214. In this implementation, the workload client 106 may send the workload key 114 to each such workload server 102 prior to generating any workload, for instance, where the key 114 as sent to a particular server 102 is encrypted with the public encryption key 112 of that server 102. The workload client 106 may thus use the workload encryption key 114 to encrypt every workload it generates, regardless of the workload server 102 it ultimately selects to send the workload to for processing.

As noted above, the workload client 106 may receive at least a portion of a workload from a sub-client, such as a workload sub-client computing device. For instance, the workload client 106 may be a development-operations (dev-ops) system, which receives portions of a workload undergoing active development from various other sub-client computing devices of the developers developing those portions. In such an example, the workload client 106 integrates these portions within a complete workload, such as a complete virtual machine image, which the client 106 submits to a selected workload server 102 for execution for testing purposes. As such, part 220 in this example includes receiving one or more portions of the workload from one or more workload sub-client computing devices, and generating the workload to include these portions received from the workload sub-clients.

The workload encryption key 114 that the workload client 106 uses to encrypt the workload (or at least a portion thereof) may be the workload key 114 of the workload client 106 itself, such that workload key 114 is particular to the client 106 and not to any sub-client. By comparison, in another implementation, generation of the workload encryption key 114 in part 218 may include receiving the workload encryption key from a workload sub-client computing device. In this case, the workload encryption key 114 that the workload client 106 uses to encrypt the workload (or at least a portion thereof) is the workload key 114 that is particular to the workload sub-client, and not to the workload client 106 itself. As such, workload client 106 may encrypt different portions of the workload with different workload encryption keys, as provided to it from different workload sub-clients, with each portion of the workload encrypted with the workload key of the sub-client that provided the portion in question.

It is further noted that each workload server 102, such as the workload server 102A performing part 226, may perform part 226 for multiple workload clients and/or multiple workload types or workloads. That is, a workload server 102 may store multiple workload encryption keys, including the workload encryption key 114. Each workload encryption key can correspond to a different workload or workload type for one or more different workload clients. Each workload encryption key can correspond to a different workload client, for all the workloads received from each such client.

The workload client 106 ultimately encrypts a generated workload with the workload encryption key 114, and sends the workload as encrypted to the selected workload server 102A for processing (228). The workload client 106 may digitally sign the encrypted workload with its own private encryption key as well, for authentication purposes. The workload client 106 may not encrypt the entire workload, but just a portion thereof, such as just the sensitive or confidential parts of the workload. The workload client 106 may further encrypt the workload as has been (partially or completely) encrypted via the workload encryption key 114 with the public encryption key 112A of the workload server 102A as well.

The workload server 102A receives the encrypted workload, and decrypts the workload using the previously provided and stored workload encryption key 114 (230), after first decrypting the encrypted workload with its private encryption key 110A if the workload after encryption with the workload encryption key 114 was then encrypted with the public encryption key 112A. If the workload client 106 signed the encrypted workload, the workload server 102A may authenticate the encrypted workload against the public encryption key of the workload client 106, as previously provided to the workload server 102A in part 212. The workload server 102A may authenticate the workload client 106 in another way as well if desired, pursuant to the identification received in part 212, such as via network address, password, or other identifying information of the client 106.

The workload server 102A executes the workload for the workload client 106 (232). The workload server 102A can encrypt execution results of the workload using the workload encryption key 114, and send the execution results to the workload client 106 (234). The workload client 106 receives the execution results, and if encrypted, decrypts the workload results with the workload encryption key 114 (236).

Figure 3:
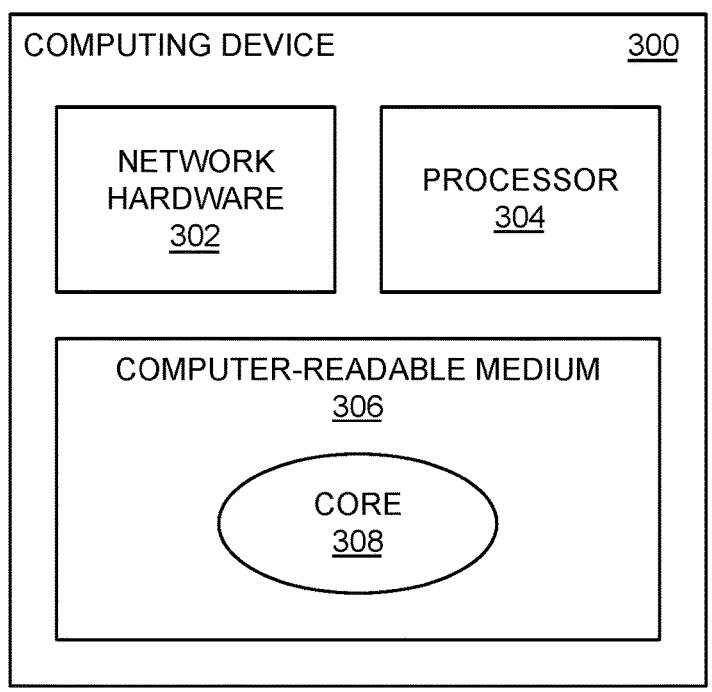
FIG. 3 is a diagram of an example computing device that can implement each of the computing devices of FIG. 1.

FIG. 3 shows an example computing device 300. The computing device 300 can be used to implement each of the workload server computing devices 102, the management computing device 104, and the workload client computing device 106 of FIG. 1. The computing device 300 includes network hardware 302, a processor 304, and a non-transitory computer-readable data storage medium 306. The computing device 300 can and typically does include other hardware components, in addition to those depicted in FIG. 3.

The network hardware 302 permits the computing device 300 to connect to the network 108, so that the computing device 300 is able to communicate with other devices connected to the network 108. The computer-readable data storage medium 306 stores computer-executable code 308 that is executable by the processor 304. The processor 304 executes the computer-executable code 308 to perform functionality. For example, if the computing device 300 is the workload client 106, execution of the code 308 results in performance of the parts of the method 200 in the left column. If the computing device 300 is the workload server 102A, execution of the code 308 results in performance of the parts of the method 200 in the middle column. If the computing device 300 is the management device 104, execution of the code results in performance of the parts of the method 200 in the right column.

The techniques that have been described herein provide for a secure manner by which workloads are provided to workload servers for execution. A workload client can trust that even if its workload is intercepted en route to a selected workload server, any confidential or sensitive information cannot be discovered. Similarly, a workload can trust that even if its workload is routed by a gateway to an untrusted workload server, the workload server will not be able to discern the confidential or sensitive information. In either case, this is because the workload client encrypts the workload with a workload encryption key shared by the client just with the trusted workload server that it has selected to execute the workload, or one or more other trusted workload servers as well.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   receiving, by a workload server computing device from a workload server management computing device over a network, identification of a workload client computing device that is an authorized workload client on whose behalf the workload server computing device is to execute received workloads;
   receiving, by the workload server computing device, a workload encryption key from the workload client computing device over the network, the workload encryption key encrypted with a public encryption key of the workload server computing device;
   decrypting, by the workload server computing device, the workload encryption key using a private encryption key of the workload server computing device corresponding to the public encryption key;
   after receiving the workload encryption key, receiving, by the workload server computing device, a workload from the workload client computing device over the network, the workload encrypted with the workload encryption key;
   decrypting, by the workload server computing device, the workload using the workload encryption key;
   authenticating, by the workload server computing, the workload client computing device using the identification of the workload client computing device previously received from the workload server computing management computing device, wherein the identification of the workload client computing device comprises a public client key of the workload client computing device, and wherein the workload received from the workload client computing device is signed with a private key of the workload client computing device corresponding to the public client key; and
   after successfully authenticating the workload client computing device, executing, by the workload server computing device, the workload for the workload client computing device.

2. The method of claim 1, further comprising:
   sending, by the workload server computing device, results of execution of the workload to the workload client computing device over the network.

3. The method of claim 2, further comprising:
   encrypting, by the workload server computing device, the results of the execution of the workload using the workload encryption key prior to sending the results to the workload client computing device over the network.

4. The method of claim 1, wherein the workload encryption key is a given workload encryption key, the client computing device is a given client computing device, and the method further comprises:
   storing, by the workload server computing device, a plurality of private encryption keys including the given workload encryption key, each private encryption key corresponding to a different client computing device and used to decrypt workloads received from the different client computing device.

5. A non-transitory computer-readable data storage medium storing computer-executable code that a workload client computing device executes to perform a method comprising:
   receiving, from a workload server management computing device over a network, a plurality of public encryption keys corresponding to a plurality of workload server computing devices that have been assigned to the workload client computing device;
   in response to receiving the public encryption keys corresponding to the workload server computing devices, for each workload server computing device:
      encrypting the workload encryption key with the public encryption key of the workload server computing device; and
      sending the workload encryption key encrypted with the public encryption key of the workload server computing device to the workload server computing device over the network;
   after encrypting the workload encryption key with the public encryption key of each workload server computing device and sending the workload encryption key encrypted with the public encryption key of the workload server computing device to the workload serve r computing device, generating a workload;
   encrypting the workload with the workload encryption key and signing the workload with a private client key of the workload client computing device on which basis the workload server computing device authenticates the workload client computing device as an authorized workload client on whose behalf the workload server computing device is to executed received workloads, the workload server computing device authenticating the workload client computing device using a public client key corresponding to the private client key, the workload server computing device receiving the public client key of the workload client computing device from the workload server management computing device;
   determining a selected workload server computing device, from the workload server computing devices, to execute the workload; and sending the workload encrypted with the workload encryption key to the selected workload server computing device over the network.

6. The non-transitory computer-readable data storage medium of claim 5, wherein the method further comprises:
sending a binding request to the workload server management computing device, over the network, for the workload server computing devices to which to bind the client computing device,
wherein the workload client computing device receives the public encryption keys corresponding to the workload server computing devices in response to sending the binding request.

7. The non-transitory computer-readable data storage medium of claim 5, wherein the method further comprises:
receiving results of execution of the workload, from the selected workload server computing device over the network, the results of execution of the workload encrypted with the workload encryption key; and
decrypting the results of execution of the workload using the workload encryption key.

8. The non-transitory computer-readable data storage medium of claim 5, wherein encrypting the workload with the workload encryption key comprises:
encrypting just a portion of the workload with the workload encryption key,
and wherein the method further comprises:
encrypting the workload, including the portion thereof encrypted with the workload encryption key, with the public encryption key of the selected workload server computing device.

9. The non-transitory computer-readable data storage medium of claim 5, wherein the method further comprises:
receiving a portion of the workload from a workload sub-client computing device,
wherein the generated workload includes the portion thereof received from the workload sub-client computing device.

10. The non-transitory computer-readable data storage medium of claim 9, wherein the method further comprises:
receiving the workload encryption key from the workload sub-client computing device, the workload encryption key particular to the workload sub-client computing device and not to the workload client computing device.

11. The non-transitory computer-readable data storage medium of claim 9, wherein the workload encryption key is particular to the workload client computing device and not to the workload sub-client computing device.

12. A workload server management computing device comprising:
network hardware to communicatively connect the workload server management computing device with a plurality of workload server computing devices and a workload client computing device over a network, each workload server computing device having a public encryption key;
a processor;
a non-transitory computer-readable data storage medium storing computer-executable code that the processor executes to:
receive a request over the network from the workload client computing device for a subset of the workload server computing devices on which the workload client computing device is permitted to send workloads for execution thereat;
in response to receiving the request, select the subset of the workload server computing devices on which the workload client computing device is permitted to send the workloads for execution thereat;
send to the workload client computing device over the network the public encryption key of each workload server computing device of the subset, within a response to the request;
send to each workload server computing device of the subset a public client key of the workload client computing device on which basis each workload server client authenticates the workload client computing device as an authorized workload client on whose behalf received workloads are to be executed,
wherein the workload client computing device uses the public encryption key of a selected workload server computing device of the subset to encrypt a workload encryption key for transmission to the selected workload server computing device, sends the encrypted workload encryption key to the selected workload server computing device, uses the workload encryption key to encrypt a workload for transmission to the selected workload server computing device that is to execute the workload, signs the workload with a private client key of the workload client computing device corresponding to the public client key of the workload client computing device that the workload server management computing device previously sent to the selected workload server, and transmits the signed and encrypted workload to the selected workload server computing device.

13. The workload server management computing device of claim 12, wherein the processor executes the computer-executable code to further:
send an identification of the workload client computing device to each workload server computing device of the subset as an authorized workload client computing device for which the workload server computing device is permitted to execute received workloads.

14. The workload server management computing device of claim 12, wherein the request is signed with a key of the workload client computing device, and the processor executes the computer-executable code to further:
authenticate the request as originating from the workload client computing device using the key of the workload client computing device.

15. The workload server management computing device of claim 14, the processor executes the computer-executable code to further:
prior to sending to the workload client computing device the public encryption key of each workload server computing device of the subset, signing the response with a key of the workload server management computing device, on which basis the workload client computing device authenticates the response as originating from the workload server management computing device.

* * * * *